(12) United States Patent
Wang et al.

(10) Patent No.: US 11,722,259 B2
(45) Date of Patent: Aug. 8, 2023

(54) HYBRID AUTOMATIC REPEAT REQUEST (HARQ) PROCESS WHEN USING SIDELINK FOR RETRANSMISSION

(71) Applicant: QUALCOMM Incorporated, San Diego, CA (US)

(72) Inventors: Hua Wang, Basking Ridge, NJ (US); Piyush Gupta, Bridgewater, NJ (US); Junyi Li, Chester, NJ (US); Xiaoxia Zhang, San Diego, CA (US); Jing Sun, San Diego, CA (US); Yisheng Xue, San Diego, CA (US); Seyed Ali Akbar Fakoorian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 149 days.

(21) Appl. No.: 16/943,098

(22) Filed: Jul. 30, 2020

(65) Prior Publication Data

US 2021/0135794 A1    May 6, 2021

Related U.S. Application Data

(60) Provisional application No. 62/927,814, filed on Oct. 30, 2019.

(51) Int. Cl.
| | | |
|---|---|---|
| *H04L 5/00* | (2006.01) | |
| *H04L 1/1812* | (2023.01) | |
| *H04L 1/1867* | (2023.01) | |
| *H04W 24/10* | (2009.01) | |
| *H04W 72/02* | (2009.01) | |

(Continued)

(52) U.S. Cl.
CPC .......... *H04L 1/1819* (2013.01); *H04L 1/0026* (2013.01); *H04L 1/189* (2013.01); *H04L 5/0055* (2013.01); *H04W 24/10* (2013.01); *H04W 72/02* (2013.01); *H04W 92/18* (2013.01)

(58) Field of Classification Search
CPC .......... H04W 56/0015; H04W 72/042; H04W 24/10; H04W 72/02; H04W 92/18; H04W 4/06; H04B 7/088; H04B 7/0695; H04L 1/1819; H04L 1/0026; H04L 1/189; H04L 5/0055; H04L 5/0048; H04L 27/2602;
(Continued)

(56) References Cited

U.S. PATENT DOCUMENTS

| | | |
|---|---|---|
| 2013/0250843 A1 | 9/2013 | Zhou et al. |
| 2019/0052436 A1 | 2/2019 | Desai et al. |

(Continued)

FOREIGN PATENT DOCUMENTS

WO    WO-2020030703 A1 *  2/2020  .......... H04B 7/0626

OTHER PUBLICATIONS

International Search Report and Written Opinion—PCT/US2020/053576—ISA/EPO—dated Dec. 15, 2020.

*Primary Examiner* — Will W Lin
(74) *Attorney, Agent, or Firm* — Patterson + Sheridan, L.L.P.

(57) ABSTRACT

Certain aspects of the present disclosure provide techniques for sidelink assisted retransmissions, in which a first UE obtains first data intended for a second UE by decoding a first transmission of the first data targeting the second UE, receives signaling indicating the first UE is to retransmit the first data to the second UE, and retransmits the first data to the second UE, via a sidelink, in response to the signaling.

24 Claims, 8 Drawing Sheets

(51) Int. Cl.
*H04L 1/00* (2006.01)
*H04W 92/18* (2009.01)

(58) Field of Classification Search
CPC ..... H04L 2001/0093; H04L 2001/0097; H04L 1/1822; H04L 1/1854; H04L 1/1864
See application file for complete search history.

(56) References Cited

U.S. PATENT DOCUMENTS

| | | | |
|---|---|---|---|
| 2020/0022175 A1* | 1/2020 | Xiong | H04L 1/1861 |
| 2020/0275412 A1* | 8/2020 | Kim | H04L 1/1819 |
| 2020/0304969 A1* | 9/2020 | Basu Mallick | H04W 4/40 |
| 2020/0351855 A1* | 11/2020 | Kung | H04L 1/1812 |
| 2021/0050956 A1* | 2/2021 | Yeo | H04L 41/0803 |
| 2021/0127396 A1* | 4/2021 | Su | H04W 72/1289 |
| 2021/0194622 A1* | 6/2021 | Takeda | H04L 1/0029 |
| 2021/0203453 A1* | 7/2021 | Kim | H04L 1/1819 |
| 2021/0219329 A1* | 7/2021 | Zhou | H04W 72/0453 |
| 2021/0242975 A1* | 8/2021 | Kim | H04W 72/20 |
| 2022/0078818 A1* | 3/2022 | Sun | H04W 72/1284 |
| 2022/0109546 A1* | 4/2022 | Panteleev | H04L 1/1887 |
| 2022/0183002 A1* | 6/2022 | Yeo | H04L 1/1607 |
| 2022/0217682 A1* | 7/2022 | Peng | H04W 72/044 |
| 2022/0217764 A1* | 7/2022 | Yoshioka | H04L 1/1854 |
| 2022/0247539 A1* | 8/2022 | Luo | H04L 1/1854 |
| 2022/0330261 A1* | 10/2022 | Yeo | H04L 5/0053 |

\* cited by examiner

HYBRID AUTOMATIC REPEAT REQUEST (HARQ) PROCESS WHEN USING SIDELINK FOR RETRANSMISSION

CROSS REFERENCE TO RELATED APPLICATION

This application hereby claims priority under 35 U.S.C. § 119 to U.S. Provisional Patent Application No. 62/927,814, filed on Oct. 30, 2019, the contents of which are incorporated herein in their entirety.

FIELD OF THE DISCLOSURE

Aspects of the present disclosure relate to wireless communications, and more particularly, to techniques for using a sidelink to assist in retransmission of data.

DESCRIPTION OF RELATED ART

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more DUs, in communication with a CU, may define an access node (e.g., which may be referred to as a BS, 5G NB, next generation NodeB (gNB or gNodeB), transmission reception point (TRP), etc.). A BS or DU may communicate with a set of UEs on downlink channels (e.g., for transmissions from a BS or DU to a UE) and uplink channels (e.g., for transmissions from a UE to BS or DU).

These multiple access technologies have been adopted in various telecommunication standards to provide a common protocol that enables different wireless devices to communicate on a municipal, national, regional, and even global level. NR (e.g., new radio or 5G) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for wireless communications by a first user equipment (UE). The method generally includes obtaining first data intended for a second UE by decoding a first transmission of the first data targeting the second UE, receiving signaling indicating the first UE is to retransmit the first data to the second UE, and retransmitting the first data to the second UE, via a sidelink, in response to the signaling.

Certain aspects provide a method for wireless communications by a network entity. The method generally includes sending first data intended to a second UE in a first transmission and signaling a first UE to retransmit the first data to the second UE via a sidelink, if the network entity fails to receive an acknowledgment that the second UE successfully received the first data in the first transmission.

Certain aspects provide a first UE. The first UE generally includes a processing system configured to obtain first data intended for a second UE by decoding a first transmission of the first data targeting the second UE, a receiver configured to receive signaling indicating the first UE is to retransmit the first data to the second UE, and a transmitter configured to retransmitting the first data to the second UE, via a sidelink, in response to the signaling.

Certain aspects provide a network entity. The network entity generally includes a processing system configured to generate first data and a transmitter configured to send the first data intended to a second UE in a first transmission and signal a first UE to retransmit the first data to the second UE via a sidelink, if the network entity fails to receive an acknowledgement that the second UE successfully received the first data in the first transmission.

Certain aspects provide a first UE. The first UE generally includes means for obtaining first data intended for a second UE by decoding a first transmission of the first data targeting the second UE, means for receiving signaling indicating the first UE is to retransmit the first data to the second UE, and means for retransmitting the first data to the second UE, via a sidelink, in response to the signaling.

Certain aspects provide a network entity. The network entity generally includes means for sending first data intended to a second UE in a first transmission and means for signaling a first UE to retransmit the first data to the second UE via a sidelink, if the network entity fails to receive an acknowledgement that the second UE successfully received the first data in the first transmission.

Certain aspects provide an apparatus for wireless communications by a first UE. The apparatus generally includes a processing system configured to obtain first data intended for a second UE by decoding a first transmission of the first data targeting the second UE and obtain signaling indicating the first UE is to retransmit the first data to the second UE, and an interface configured to output the first data for re-transmission to the second UE, via a sidelink, in response to the signaling.

Certain aspects provide an apparatus for wireless communications by a network entity. The apparatus generally includes an interface configured to output first data for transmission to a second UE and a processing system is further configured to signal a first UE to retransmit the first data to the second UE via a sidelink, if the network entity fails to receive an acknowledgement that the second UE successfully received the first data in the transmission.

Certain aspects provide a computer-readable medium for wireless communications by a first UE. The computer-readable medium generally includes codes executable to obtain first data intended for a second UE by decoding a first transmission of the first data targeting the second UE, receive signaling indicating the first UE is to retransmit the first data to the second UE, and retransmit the first data to the second UE, via a sidelink, in response to the signaling.

Certain aspects provide a computer-readable medium for wireless communications by a network entity. The computer-readable medium generally includes codes executable to send first data intended to a second UE in a first transmission and signal a first UE to retransmit the first data to the second UE via a sidelink, if the network entity fails to receive an acknowledgement that the second UE successfully received the first data in the first transmission.

Certain aspects provide means for, apparatus, and/or computer readable medium having computer executable code stored thereon, for performing the techniques described herein.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Aspects of the present disclosure provide apparatus, methods, processing systems, and computer readable mediums for using a sidelink to assist in retransmission of data (sidelink-assisted retransmissions).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

New Radio (NR) is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

New radio (NR) access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

Example Wireless Communications System

Figure 1:
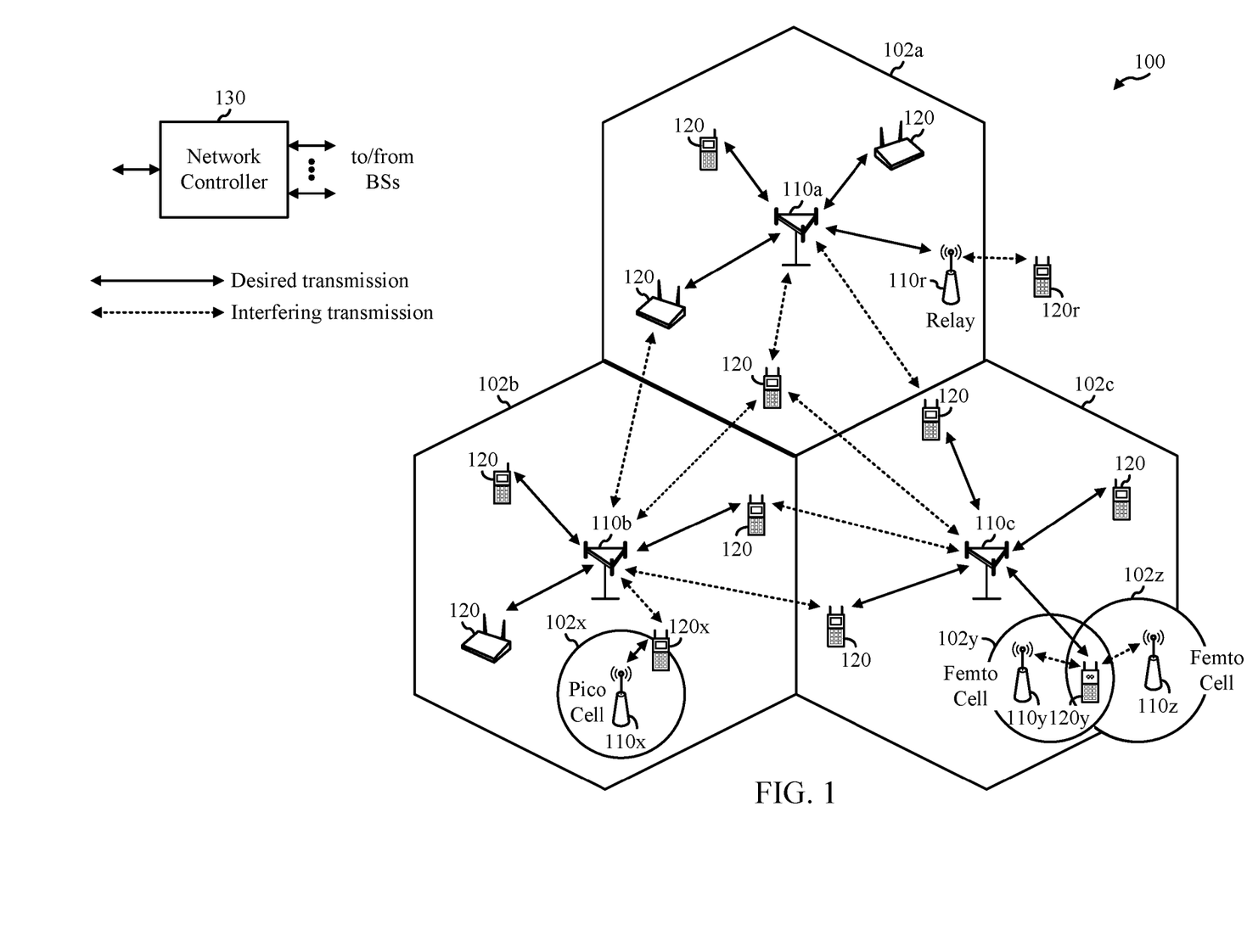
FIG. 1 is a block diagram conceptually illustrating an example telecommunications system, in accordance with certain aspects of the present disclosure.

FIG. 1 illustrates an example wireless communication network 100 in which aspects of the present disclosure may be performed. For example, UEs 120 of FIG. 1 may be configured to perform operations for sidelink assisted retransmissions described below with reference to FIG. 6. Similarly, BSs 110 of FIG. 1 may be configured to perform operations described below with reference to FIG. 7 (e.g., to trigger a UE performing operations 600 to assist with sidelink retransmissions).

The wireless communication network 100 may be, for example, a New Radio (NR) or 5G network. BSs 110 may be involved in a multiple transmission reception point (multi-TRP) transmission to a UE 120, in accordance with operations described below with reference to FIGS. 8, 12, and 13 below.

As illustrated in FIG. 1, the wireless communication network 100 may include a number of base stations (BSs) 110 and other network entities. A BS may be a station that communicates with user equipments (UEs). Each BS 110 may provide communication coverage for a particular geographic area. In 3GPP, the term "cell" can refer to a coverage area of a Node B (NB) and/or a NB subsystem serving this coverage area, depending on the context in which the term is used. In NR systems, the term "cell" and next generation NodeB (gNB or gNodeB), NR BS, 5G NB, access point (AP), or transmission reception point (TRP) may be interchangeable. In some examples, a cell may not necessarily be stationary, and the geographic area of the cell may move according to the location of a mobile BS. In some examples, the base stations may be interconnected to one another and/or to one or more other base stations or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

Wireless communication network 100 may be a heterogeneous network that includes BSs of different types, e.g., macro BS, pico BS, femto BS, relays, etc. These different types of BSs may have different transmit power levels, different coverage areas, and different impact on interference in the wireless communication network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless communication network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using TDD. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS.

Figure 2:
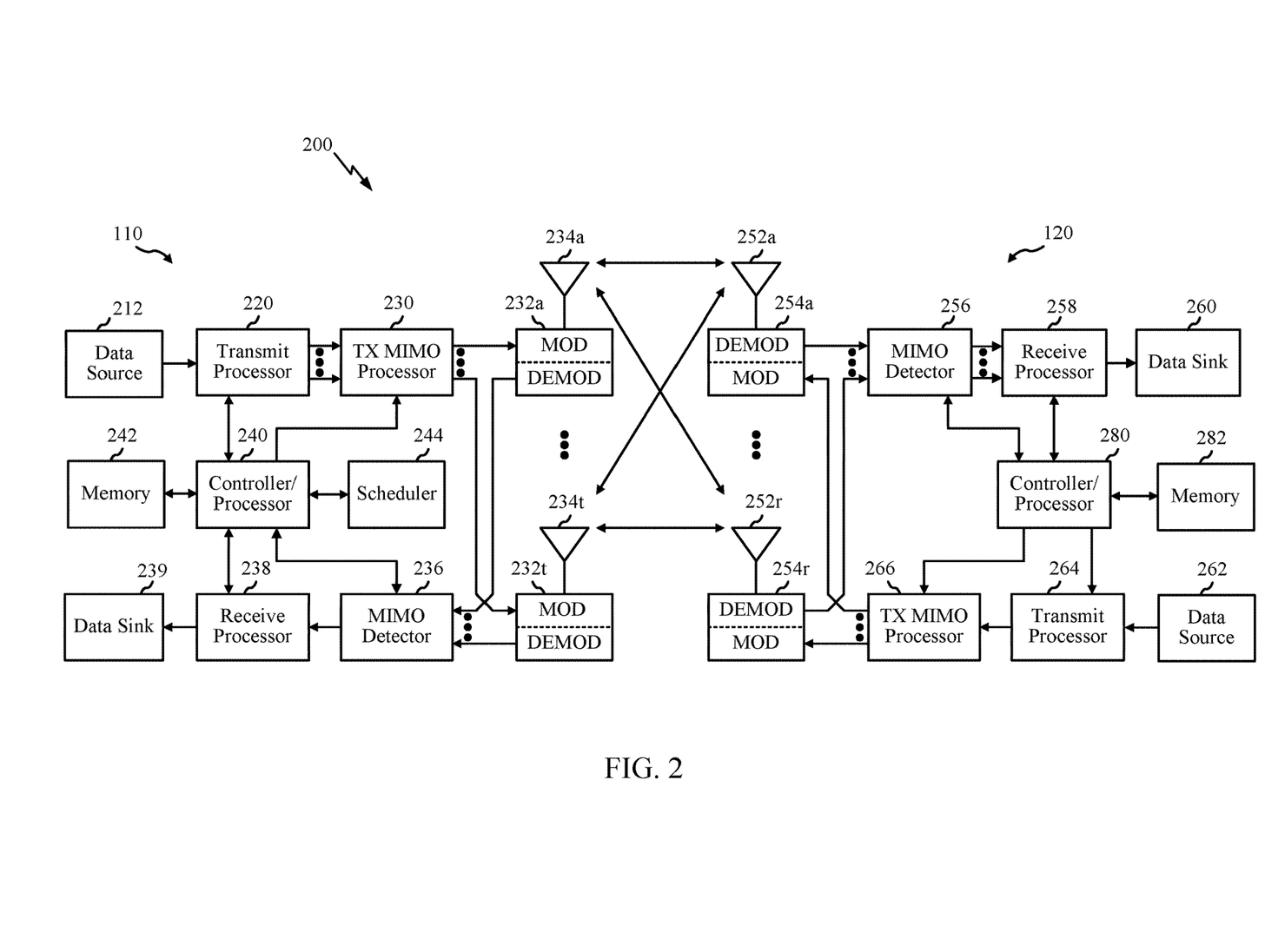
FIG. 2 is a block diagram conceptually illustrating a design of an example base station (BS) and user equipment (UE), in accordance with certain aspects of the present disclosure.

FIG. 2 illustrates example components of BS 110 and UE 120 (as depicted in FIG. 1), which may be used to implement aspects of the present disclosure. For example, antennas 252, processors 266, 258, 264, and/or controller/processor 280 of the UE 120 may be configured to perform operations 600 of FIG. 6 and/or antennas 234, processors 220, 230, 238, and/or controller/processor 240 of the BS 110 may be configured to perform operations 700 of FIG. 7.

At the BS 110, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (e.g., encode and symbol map) the data and control information to obtain data symbols and control symbols, respectively. The processor 220 may also generate reference symbols, e.g., for the primary synchronization signal (PSS), secondary synchronization signal (SSS), and cell-specific reference signal (CRS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 120, the antennas 252a through 252r may receive the downlink signals from the base station 110 and may provide received signals to the demodulators (DE-MODs) in transceivers 254a through 254r, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 120 to a data sink 260, and provide decoded control information to a controller/processor 280.

On the uplink, at UE 120, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the demodulators in transceivers 254a through 254r (e.g., for SC-FDM, etc.), and transmitted to the base station 110. At the BS 110, the uplink signals from the UE 120 may be received by the antennas 234, processed by the modulators 232, detected by a MIMO detector 236 if applicable, and further processed by a receive processor 238 to obtain decoded data and control information sent by the UE 120. The receive processor 238 may provide the decoded data to a data sink 239 and the decoded control information to the controller/processor 240.

The controllers/processors 220 and 280 may direct the operation at the BS 110 and the UE 120, respectively. The processor 220 and/or other processors and modules at the BS 110 may perform or direct the execution of processes for the techniques described herein. The memories 242 and 282 may store data and program codes for BS 110 and UE 120, respectively. A scheduler 244 may schedule UEs for data transmission on the downlink and/or uplink.

Figure 3:
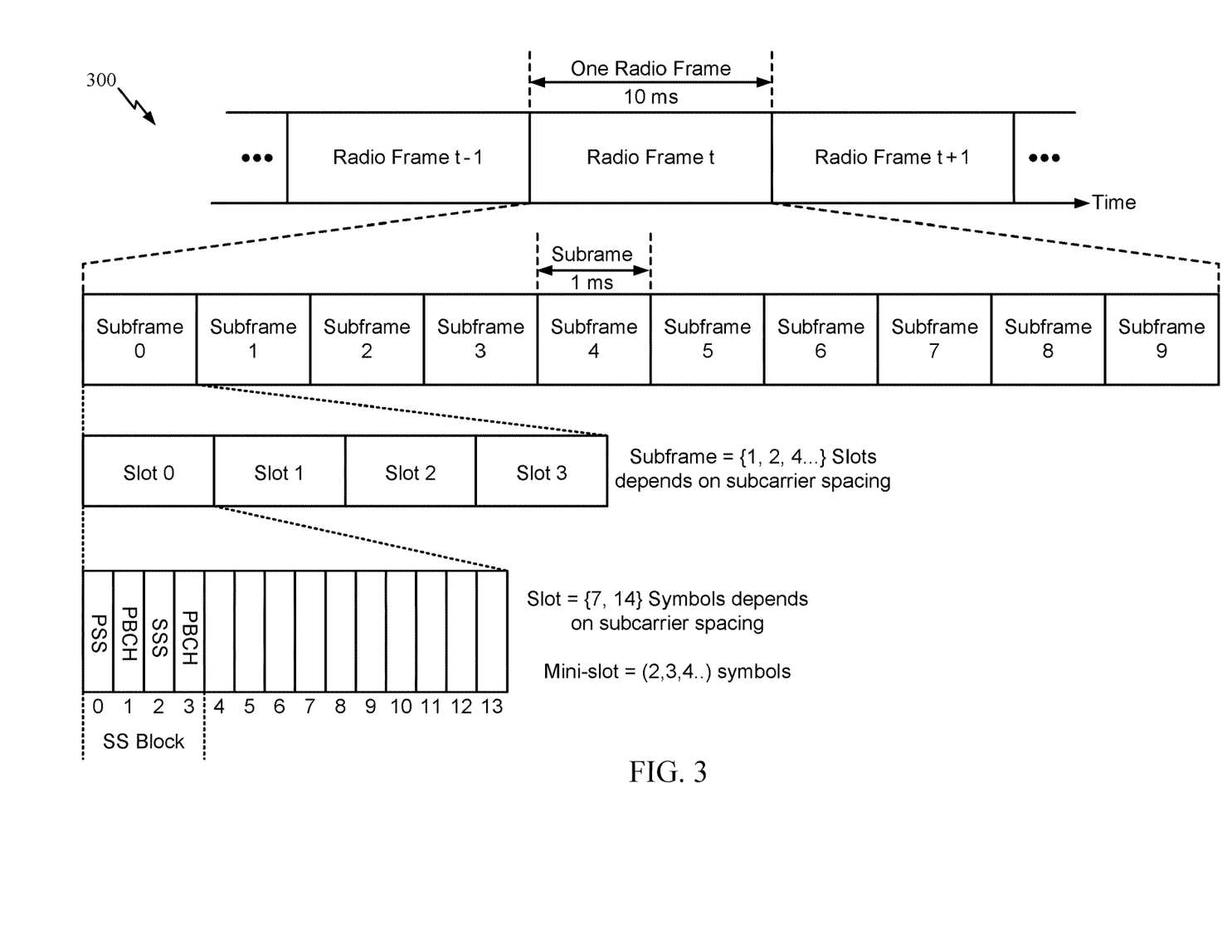
FIG. 3 illustrates an example of a frame format for a new radio (NR) system, in accordance with certain aspects of the present disclosure.

FIG. 3 is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols). Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 3. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SS block can be transmitted up to sixty-four times, for example, with up to sixty-four different beam directions for mmW. The up to sixty-four transmissions of the SS block are referred to as the SS burst set. SS blocks in an SS burst set are transmitted in the same frequency region, while SS blocks in different SS bursts sets can be transmitted at different frequency locations.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example HARQ Process when Using Sidelink for Retransmission

NR networks may provide for sidelink transmissions between a transmitter user equipment (UE) and a receiver UE. In some cases, a UE can be configured with multiple transmit resource pools and multiple receive resource pools. When data is to be sent using a resource pool, the actual transmission resources may be selected dynamically from within the pool using one of various modes.

Within a PSCCH period there are separate subframe pools and resource block pools for control (physical sidelink control channel or PSCCH) and data (physical sidelink shared channel or PSSCH). Typically, PSCCH subframes precede subframes for PSSCH transmissions, similar to how in conventional (direct link) the control region precedes the data part of a subframe. The PSCCH carries sidelink control information (SCI) messages, which describe the dynamic transmission properties of the PSSCH that follow it. The receiving UE searches all configured PSCCH resource pools for SCI transmissions of interest to it. A UE can be a member of more than one sidelink communications group.

Among various use cases for sidelink communications is Industrial Internet of Things (IoT), for example, where UEs may communicate measurement and control data. Features of sidelink communications that might benefit Industrial IoT applications include reduced latency, multi-path diversity, coverage extension, battery-lifetime improvement, location enhancement, and Infrastructure-less communication.

Figure 4A:
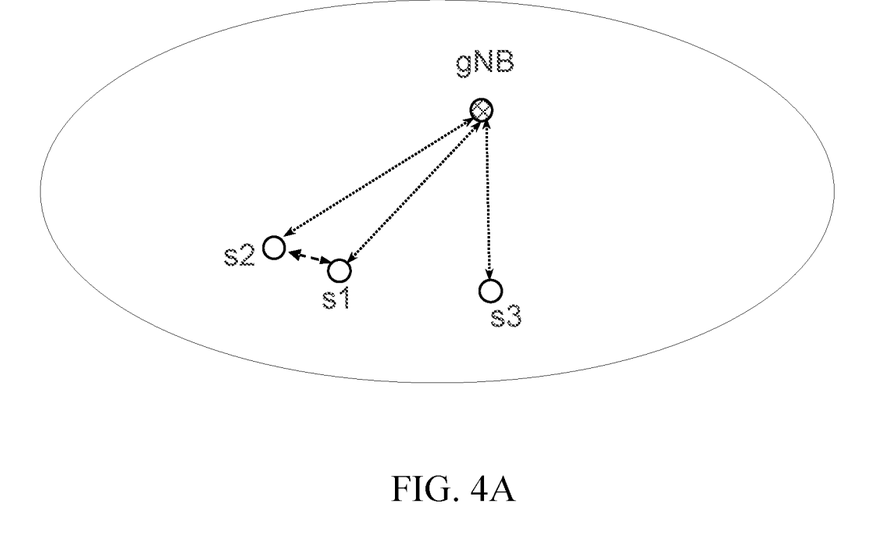
FIGS. 4A and 4B illustrate example sidelink communication modes, in which certain aspects of the present disclosure may be practiced.
Figure 4B:
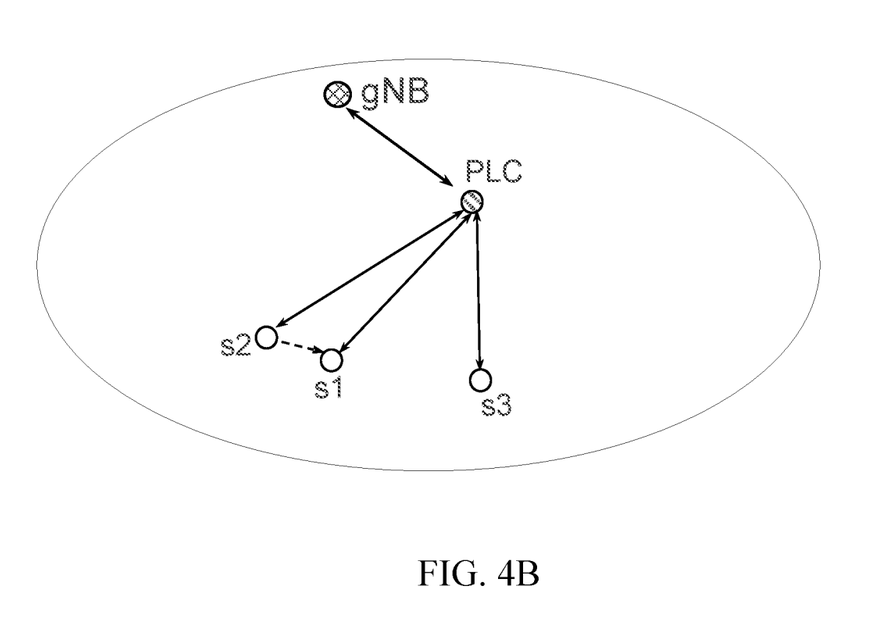

FIG. 4A illustrates a first scenario suitable for IoT, where a serving base station (e.g., gNB) may allocate resources for sidelink communications. The example of FIG. 4A assumes the gNB has allocated sidelink resources, at least for a transmission from a transmitter UE (S2) to a receiver UE (S1). In another mode, a transmitting UE itself may select the resources according to certain rules (e.g., designed to reduce collisions). FIG. 4B illustrates a second scenario, where another device, such as a PLC (programmable logic controller) communicates with the UEs. In such a scenario, control signals may come from the gNB (as in the scenario shown in FIG. 4A) or from the PLC.

In scenarios shown in FIGS. 4A and 4B, initial transmissions (e.g., control signals) to the UEs occur via a direct link from the gNB (FIG. 4A) or may occur via a direct link from the PLC or gNB (FIG. 4B). In some cases, however, these initial transmissions may not be successful, for example, due to blockage or poor channel conditions.

In such cases, aspects of the present disclosure propose using sidelink communications between UEs to assist in re-transmission. As will be described in greater detail below, a UE or group of UEs may be enlisted to re-transmit data in the case an initial transmission from a gNB or sidelink is not successful.

Figure 5:
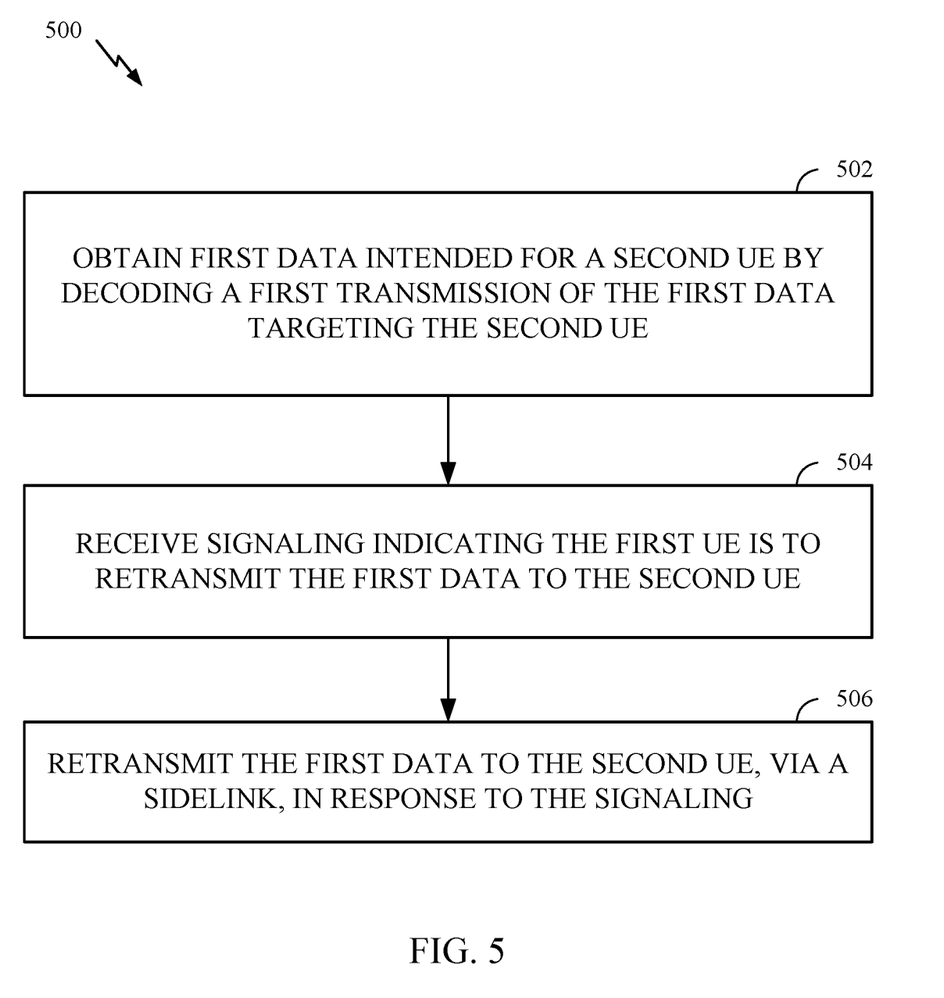
FIG. 5 illustrates example operations that may be performed by a UE, in accordance with certain aspects of the present disclosure.

FIG. 5 illustrates example operations 500 for wireless communications by a user equipment (UE), in accordance with certain aspects of the present disclosure. The operations 500 may be performed, for example, by a first UE (e.g., such as a UE 120 in the wireless communication network 100) assisting a gNB or PLC in re-transmissions to another UE via a sidelink.

Operations 500 begin at 502, by obtaining first data intended for a second UE by decoding a first transmission of the first data targeting the second UE. At 504, the first UE receives signaling indicating the first UE is to retransmit the first data to the second UE. At 506, the first UE retransmits the first data to the second UE, via a sidelink, in response to the signaling.

Figure 6:
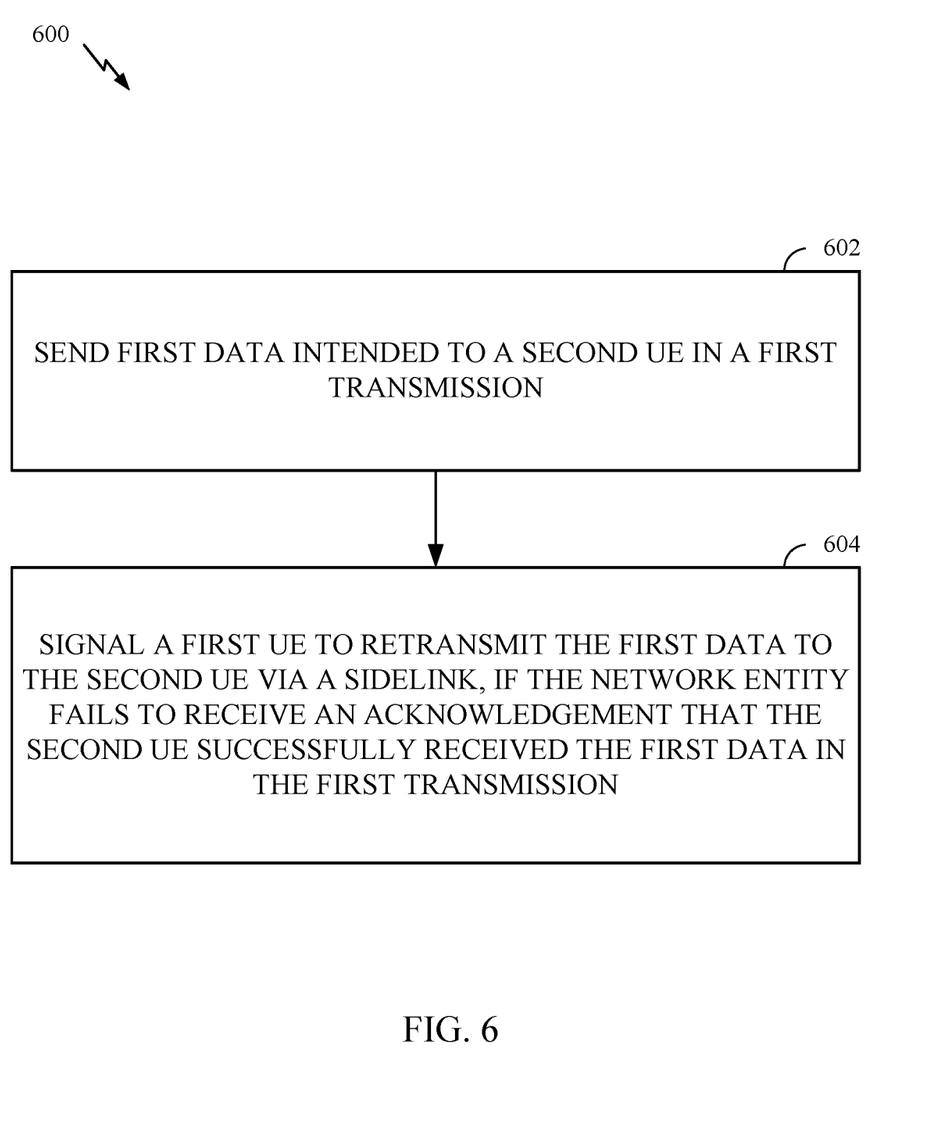
FIG. 6 illustrates example operations that may be performed by a network entity, in accordance with certain aspects of the present disclosure.

FIG. 6 illustrates example operations 600 for wireless communications by a network entity, in accordance with certain aspects of the present disclosure. The operations 600 may be performed, for example, by a gNB or PLC of FIG. 4A or 4B to retransmit data via a sidelink with the assistance of a first UE performing operations 500 of FIG. 5.

Operations 600 begin at 602, by sending first data intended for a second UE in a first transmission. At 604, the network entity signals a first UE to retransmit the first data to the second UE via a sidelink, if the network entity fails to receive an acknowledgment that the second UE successfully received the first data in the first transmission.

Figure 7A:
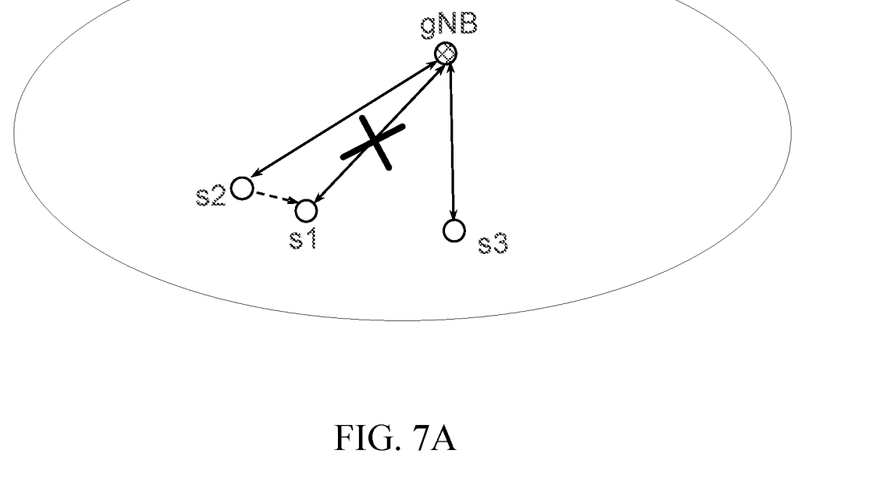
FIGS. 7A and 7B illustrate examples of sidelink assisted retransmissions, in accordance with certain aspects of the present disclosure.
Figure 7B:
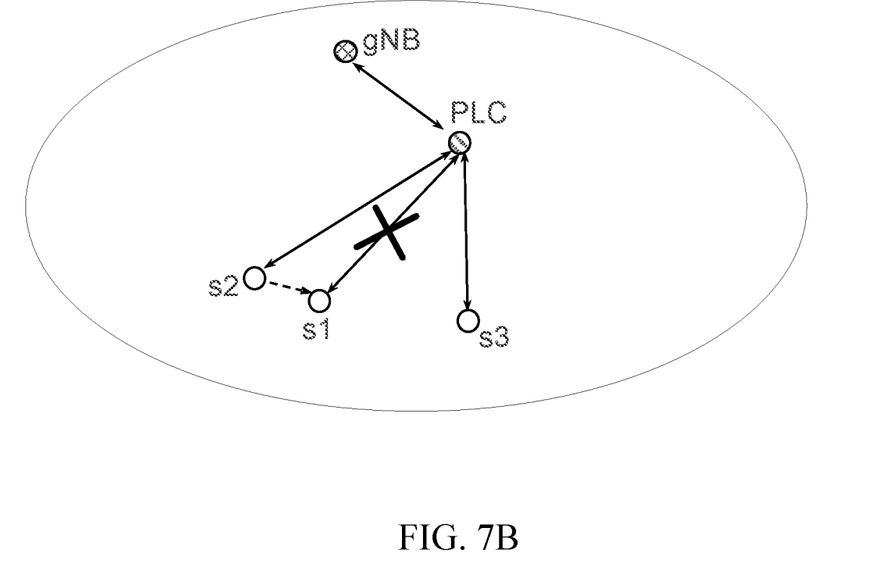

FIG. 7A shows an example of sidelink assisted re-transmission for the scenario shown in FIG. 4A. As shown, an initial (direct link) transmission of data from the gNB to UE S1 may fail. After detecting the failure, for example after not receiving a positive acknowledgment (ACK) from UE S1, the gNB triggers UE S2 to re-transmit the data to UE S1 via the sidelink. FIG. 7B shows a similar example for the scenario shown in FIG. 4B. As shown, after the PLC detects the failure of in initial transmission to UE S1, the PLC triggers UE S2 to re-transmit the data to UE S1 via the sidelink.

Figure 8A:
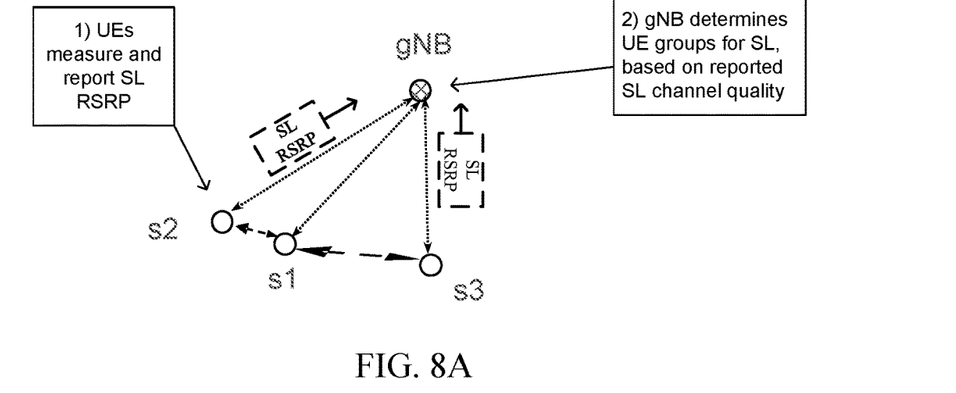
FIGS. 8A-8C illustrate example steps to enable sidelink assisted retransmissions, in accordance with certain aspects of the present disclosure.
Figure 8B:
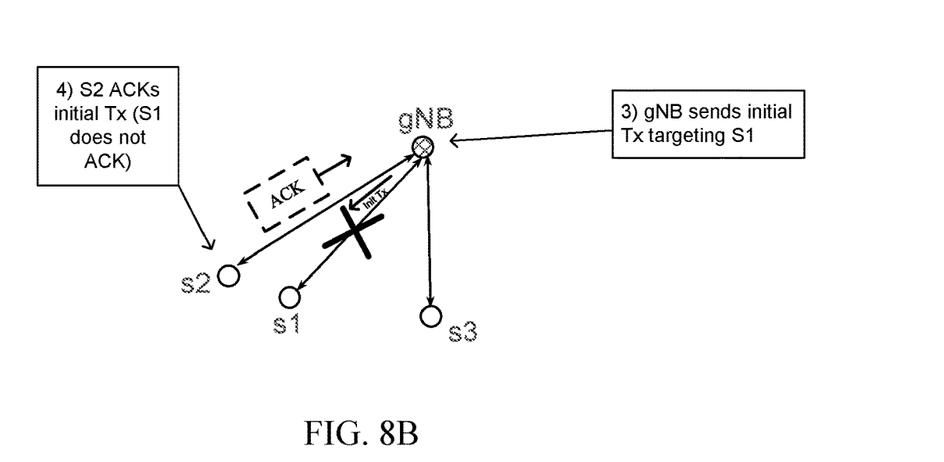
Figure 8C:
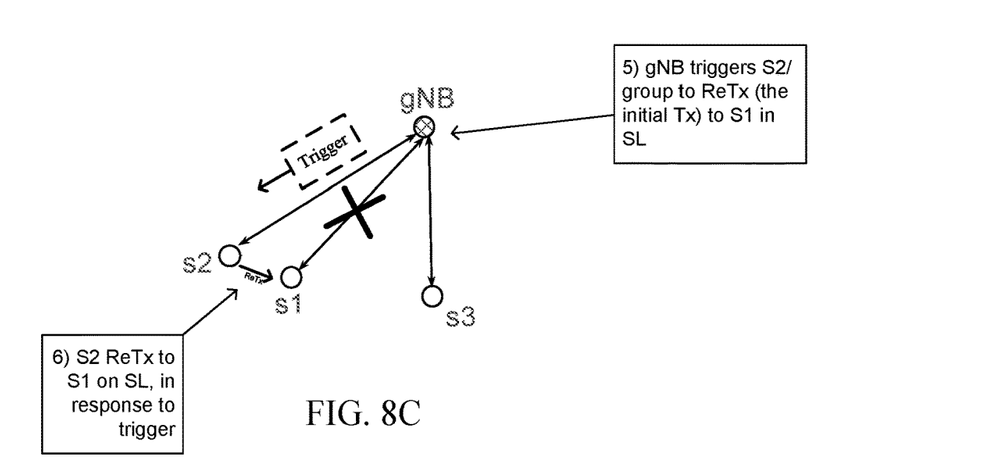

Various steps may be performed to prepare a UE or set of UEs to assist in sidelink retransmissions. FIGS. 8A-8C illustrate examples of such steps, as well as how UEs may subsequently assist in retransmissions, for the scenario shown in FIGS. 4A and 7A. Similar steps may be performed for the scenario shown in FIGS. 4B and 7B, for example, with the PLC performing action performed by the gNB in FIGS. 8A-8C (e.g., sending initial data and triggering retransmission).

As illustrated in FIG. 8A, as an initial step (step 1), the UEs may perform sidelink channel measurement (e.g., measuring sidelink RSRP using pilot signals) and report sidelink channel quality to the gNB. Based on the reported sidelink channel measurement, the gNB may determine UE groups for sidelink (step 2). For example, sets of UEs that all report good sidelink channel quality between each other may be grouped together as sidelink retransmissions between these UEs may have the best chance of success.

In some cases, UEs that are candidates to assist in retransmitting data via a sidelink may first obtain the data by monitoring the initial (direct link) transmissions from the gNB. gNBs may confirm good candidates for assisting in re-transmissions based on acknowledgment feedback.

This is illustrated in FIG. 8B, where a gNB sends an initial transmission targeting UE S1 (step 3). In this example, UE S1 fails to successfully receive the initial transmission (as indicated by the "X"). UE S2, on the other hand, successfully decodes the initial transmission and sends an ACK to gNB (at step 4, effectively identifying itself as a potential assisting UE).

As illustrated in FIG. 8C, after receiving the ACK from UE S2 (and not receiving an ACK from UE S1), the gNB sends a trigger to UE S2 (at step 5). After receiving the trigger, UE S2 retransmits the data to UE S1 via the sidelink (step 6). The trigger signaling may take any suitable form, such as Downlink Control Information (DCI). In some cases, the trigger may be sent to each UE in a group containing the target of the initial transmission. In such cases, separate UE-specific triggers could be sent or a group-cast trigger could be sent.

In some cases, an assisting UE (e.g., UE S2 in the example described above) may also have its own data (e.g., transport block) to acknowledge. In such cases, the assisting UE may send its own separate (separately coded) ACK/NACK for its own TB. As an alternative, the assisting UE could send a single message with the ACK for the targeted UE (e.g., UE S1 in the example described above) TB and its own TB jointly coded.

In some cases, the same or separate HARQ processes may be used for the initial transmission and retransmission. For example, the initial transmission from the gNB/PLC may include a HARQ process ID in DCI (if via a direct link from the gNB) or SCI (if via sidelink from the PLC). In some cases, the retransmission from the assisting UE may include the same HARQ process ID in the SCI corresponding to the retransmitted TB.

In some cases, the assisting UE may also have sidelink traffic for the targeted UE, in addition to the retransmitted data from gNB/PLC to targeted UE. In such cases, the assisting UE may use some mechanism to differentiate these two HARQ process.

According to one option, the UE may add one bit in the SCI to indicate whether the HARQ process is for the assisting UE's own sidelink traffic or for retransmission of the gNB/PLC's traffic. According to another option, a subset of HARQ IDs may be reserved for retransmitted traffic. In other words, these HARQ IDs may be used only for retransmitted traffic.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components. For example, various operations shown in FIG. 5 may be performed by various processors shown in FIG. 2, such as processors 266, 258, 264, and/or controller/processor 280 of the UE 120. Various operations shown in FIG. 6 may be performed by various processors shown in FIG. 2, such as processors 220, 230, 238, and/or controller/processor 240 of the BS 110.

Means for receiving may include a receiver (such as one or more antennas or receive processors) illustrated in FIG. 2. Means for transmitting, means for retransmitting, and/or means for sending may include a transmitter (such as one or more antennas or transmit processors) illustrated in FIG. 2. Means for measuring, means for reporting, means for providing, means for distinguishing, means for selecting and means for including may include a processing system, which may include one or more processors, such as processors 266, 258, 264, and/or controller/processor 280 of the UE 120 and/or processors 220, 230, 238, and/or controller/processor 240 of the BS 110 shown in FIG. 2.

In some cases, rather than actually transmitting a frame a device may have an interface to output a frame for transmission (a means for outputting). For example, a processor may output a frame, via a bus interface, to a radio frequency (RF) front end for transmission. Similarly, rather than actually receiving a frame, a device may have an interface to obtain a frame received from another device (a means for obtaining). For example, a processor may obtain (or receive) a frame, via a bus interface, from an RF front end for reception.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIGS. 5 and/or 6.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be used.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications by a first user equipment (UE), comprising:
    obtaining first data, from a network entity, intended for a second UE, wherein the obtaining includes decoding a first transmission of the first data intended for the second UE;
    receiving signaling indicating the first UE is to retransmit the first data to the second UE; and
    in response to the signaling:
        transmitting sidelink control information (SCI) scheduling a physical sidelink shared channel (PSSCH) transmission from the first UE to the second UE, wherein the SCI includes a hybrid automatic repeat request (HARQ) process identifier (ID), and wherein the SCI indicates the HARQ process ID is associated with a retransmission of data from the network entity; and
        retransmitting the first data to the second UE via the PSSCH.

2. The method of claim 1, further comprising:
    measuring channel quality of a sidelink between the first UE and the second UE; and
    reporting the measured channel quality to the network entity.

3. The method of claim 1, further comprising:
    receiving signaling indicating the first UE is part of a group of one or more UEs that retransmit data to the second UE.

4. The method of claim 1, further comprising:
obtaining second data, from the network entity, intended for the second UE, wherein the obtaining includes decoding a second transmission of the second data intended for the second UE; and
providing a first acknowledgment feedback for the second transmission.

5. The method of claim 4, further comprising:
obtaining third data, from the network entity, intended for the first UE, wherein the obtaining includes decoding a third transmission of the third data targeting the first UE; and
providing a second acknowledgment feedback for the third transmission.

6. The method of claim 5, wherein the first acknowledgment feedback for the second transmission and the second acknowledgment feedback for the third transmission are jointly coded.

7. The method of claim 1, wherein the first transmission includes the HARQ process ID.

8. The method of claim 1, further comprising:
transmitting second SCI scheduling a second PSSCH transmission from the first UE to the second UE, wherein the second SCI includes a second HARQ process ID, and wherein the second SCI indicates the second HARQ process ID is associated with a sidelink data; and
transmitting the sidelink data to the second UE.

9. The method of claim 1, wherein the a bit in the SCI indicates the HARQ process ID is for the associated with a retransmission of data from the network entity or is associated with sidelink data.

10. The method of claim 1, further comprising:
selecting a value for the HARQ process ID from a first subset of HARQ process IDs, wherein the first subset of HARQ process IDs reserved for retransmission by the first UE of data from the network entity intended for the first UE, and wherein a second subset of the HARQ process IDs are reserved for transmission of sidelink data from the first UE to the second UE.

11. A method for wireless communications by a network entity, comprising:
outputting first data intended to a second UE in a first transmission;
outputting second data intended to a first UE in a second transmission;
obtaining, from the first UE, first acknowledgment feedback for the first transmission and second acknowledgment feedback for the second transmission, wherein the first acknowledgment feedback and the second acknowledgment feedback are jointly coded; and
signaling the first UE to retransmit the first data to the second UE via a sidelink when the network entity fails to receive the first acknowledgment feedback indicating that the second UE successfully received the first data in the first transmission.

12. The method of claim 11, further comprising:
receiving, from the first UE, a report of measured channel quality of the sidelink;
including the first UE in a group of one or more UEs that retransmit data to the second UE; and
signaling the first UE indicating the first UE is part of the group.

13. A first user equipment (UE), comprising:
a processing system configured to:
obtain first data, from a network entity, intended for a second UE, wherein the processing system being configured to obtain the first data includes the processing system being configured to decode a first transmission of the first data intended for the second UE;
a receiver configured to receive signaling indicating the first UE is to retransmit the first data to the second UE; and
a transmitter configured to, in response to the signaling:
transmit sidelink control information (SCI) scheduling a physical sidelink shared channel (PSSCH) transmission from the first UE to the second UE, wherein the SCI includes a hybrid automatic repeat request (HARQ) process identifier (ID), and wherein the SCI indicates the HARQ process ID is associated with a retransmission of data from the network entity; and
retransmit the first data to the second UE via the PSSCH.

14. The first UE of claim 13, wherein the processing system is further configured to:
measure channel quality of a sidelink between the first UE and the second UE; and
report the measured channel quality to the network entity.

15. The first UE of claim 13, wherein the receiver is further configured to:
receive signaling indicating the first UE is part of a group of one or more UEs that retransmit data to the second UE.

16. The first UE of claim 13, wherein the processing system is further configured to:
obtain second data, from the network entity, intended for the second UE, wherein the processing system being configured to obtain the second data includes the processing system being configured to decode a second transmission of the second data intended for the second UE; and
provide a first acknowledgment feedback for the second transmission.

17. The first UE of claim 16, wherein:
the processing system is further configured to obtain third data, from the network entity, intended for the first UE, wherein the processing system being configured to obtain the third data includes the processing system being configured to decode a third transmission of the third data targeting the first UE; and
the processing system is further configured to provide a second acknowledgment feedback for the third transmission.

18. The first UE of claim 17, wherein the first acknowledgment feedback for the second transmission and the second acknowledgment feedback for the third transmission are jointly coded.

19. The first UE of claim 13, wherein the first transmission includes the HARQ process ID.

20. The first UE of claim 13, wherein the transmitter is further configured to:
transmit second SCI scheduling a second PSSCH transmission from the first UE to the second UE, wherein the second SCI includes a second HARQ process ID, and wherein the second SCI indicates the second HARQ process ID is associated with a sidelink data; and
transmit the sidelink data to the second UE.

21. The first UE of claim 13, wherein the a bit in the SCI indicates the HARQ process ID is associated with a retransmission of data from the network entity or is associated with sidelink data.

22. The first UE of claim 13, wherein the processing system is further configured to:
  select a value for the HARQ process ID from a first subset of HARQ process IDs, wherein the first subset of HARQ process IDs reserved for retransmission by the first UE of data from the network entity intended for the first UE, and wherein a second subset of the HARQ process IDs are reserved for transmission of sidelink data from the first UE to the second UE.

23. A network entity, comprising:
  a processing system configured to generate first data intended to a second UE and second data intended to a first UE; and
  a transmitter configured to:
    send the first data intended to the second UE in a first transmission; and
    send the second data intended to the first UE in a second transmission; and
  a receiver configured to receive, from the first UE, first acknowledgment feedback for the first transmission and second acknowledgment feedback for the second transmission, wherein the first acknowledgment feedback and the second acknowledgment feedback are jointly coded, and wherein
  the transmitter is configured to signal the first UE to retransmit the first data to the second UE via a sidelink when the network entity fails to receive the first acknowledgment feedback indicating that the second UE successfully received the first data in the first transmission.

24. The network entity of claim 23, wherein:
  the receiver configured to receive, from the first UE, a report of measured channel quality of the sidelink;
  the processing system is further configured to include the first UE in a group of one or more UEs that retransmit data to the second UE; and
  the transmitter is further configured to signal the first UE indicating the first UE is part of the group.

* * * * *